Figure 1:
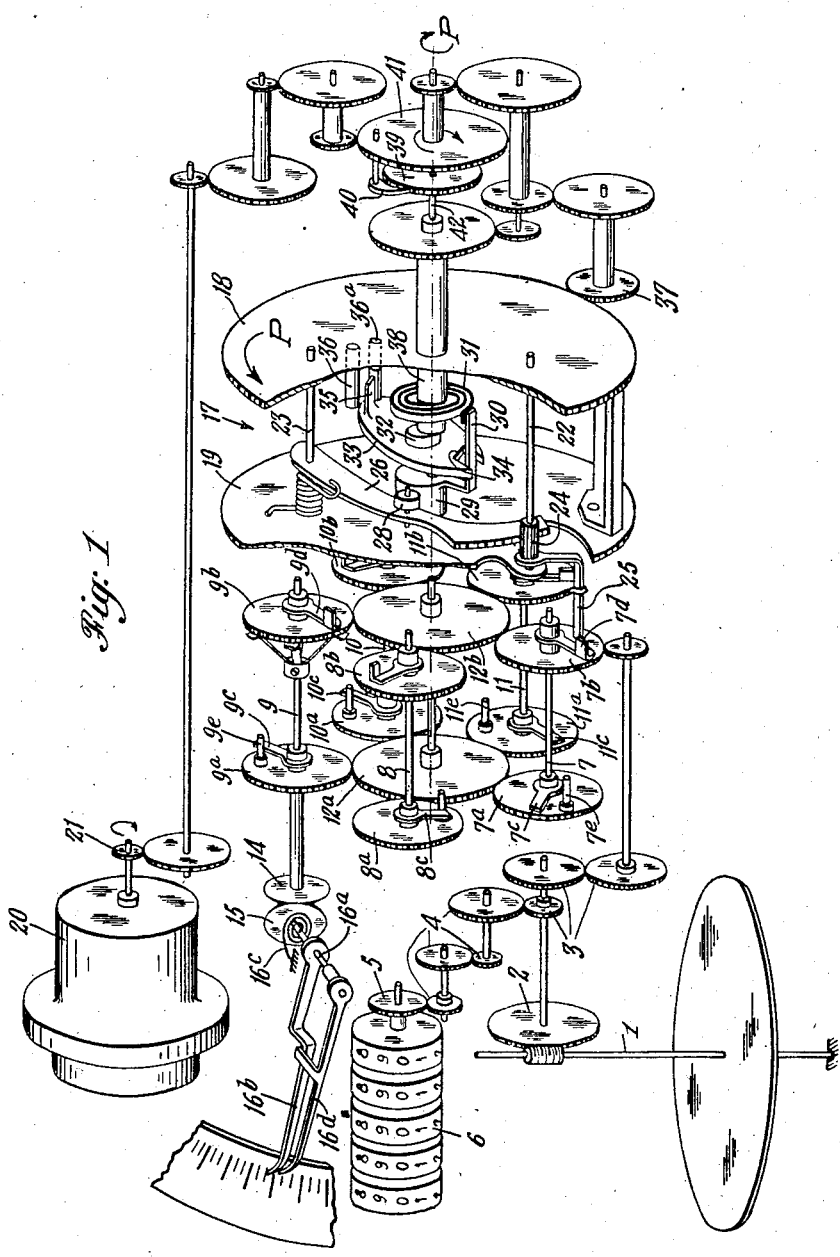

Aug. 14, 1945. P. HEYNISCH 2,382,009
MAXIMUM DEMAND METERING DEVICE
Filed Dec. 14, 1942 3 Sheets-Sheet 3
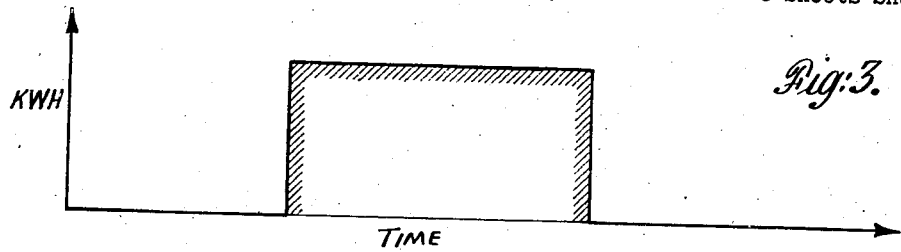
Fig. 3.
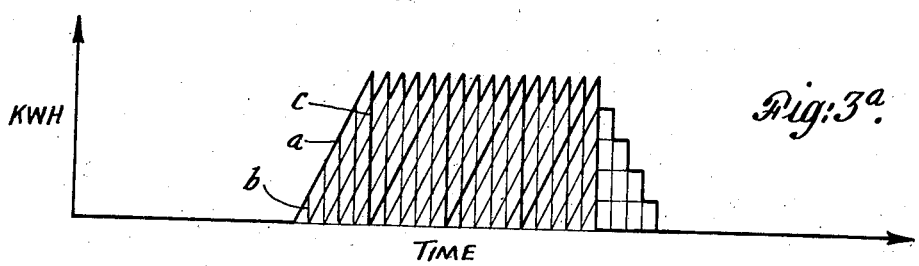
Fig. 3ª.
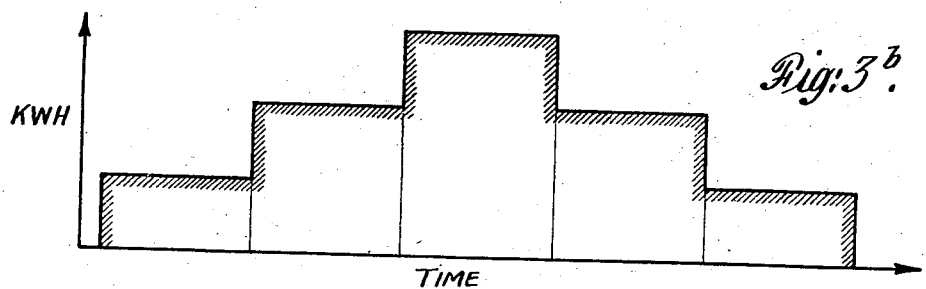
Fig. 3ᵇ.
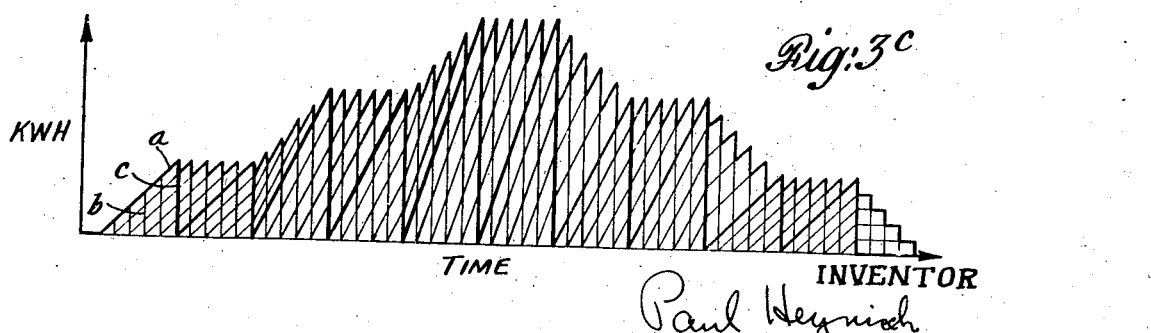
Fig. 3ᶜ.
INVENTOR
Paul Heynisch
BY
ATTORNEY Patented Aug. 14, 1945

2,382,009

UNITED STATES PATENT OFFICE 2,382,009

MAXIMUM DEMAND METERING DEVICE

Paul Heynisch, Zug, Switzerland, assignor to Landis & Gyr, A. G., a corporation of Switzerland Application December 14, 1942, Serial No. 469,035
In Switzerland December 15, 1941

10 Claims. (Cl. 171—34)

The known maximum meters used for ascertaining the maximum demand of electric plants are in the main fitted with a pusher or carrier driven by the counting system for a maximum pointer or a printing recorder which is uncoupled from the meter at regular time intervals (recording or clock periods), e. g., every 15 minutes, in order to return to its initial position.

With such meters, however, the maximum loads of the plant are only then accurately indicated if this load has remained at least once unaltered double the time of the recording period. Therefore, for determining the true maximum consumption it is essential to know at which juncture of the load time the recording period begins. Usually the latter does not coincide with the same period of time during which the maximum load or maximum consumption occurs. According to the "position" of the recording period with respect to the load period errors may arise up to 50 per cent.

Now such inaccuracies might be compensated for by shortening the recording period arbitrarily with regard to a fixed clock period, but this would not be feasible in connection with conventional clocks and the operating methods of maximum meters in general use.

In order to obviate to the utmost the aforementioned drawbacks without a shortening of the recording period under the well-tested measure of at least 15 minutes, several pushers can be employed, whereby, however, the initial and the end times, respectively, of the individual recording periods of such pushers are displaced with respect to each other, each pusher turning back to its starting position after expiration of a recording period according to this displacement.

The more pushers that are employed, i. e., the shorter the time intervals of the individual consecutive recording periods are made, the nearer we approach the determination of the true maximum demand, of course, in an asymptotic form. Usually a sufficient accuracy is attained with 5 pushers to answer practical requirements.

This problem is solved in its essentials with this invention by altering the known maximum demand metering devices with several pushers and making the pushers act on a common organ mechanically connected to them through the medium of an auxiliary force, such organ functioning both as pointer (mean load value indicator) and as pusher for a sweep hand (maximum pointer) indicating the maximum consumption.

The annexed drawings and the following description set forth in detail certain structure embodying the invention, such disclosed means constituting, however, but one of various structural forms in which the principle of the invention may be used.

In said annexed drawings:

Fig. 1 is a simplified perspective view of the instrument according to

Figure 2:
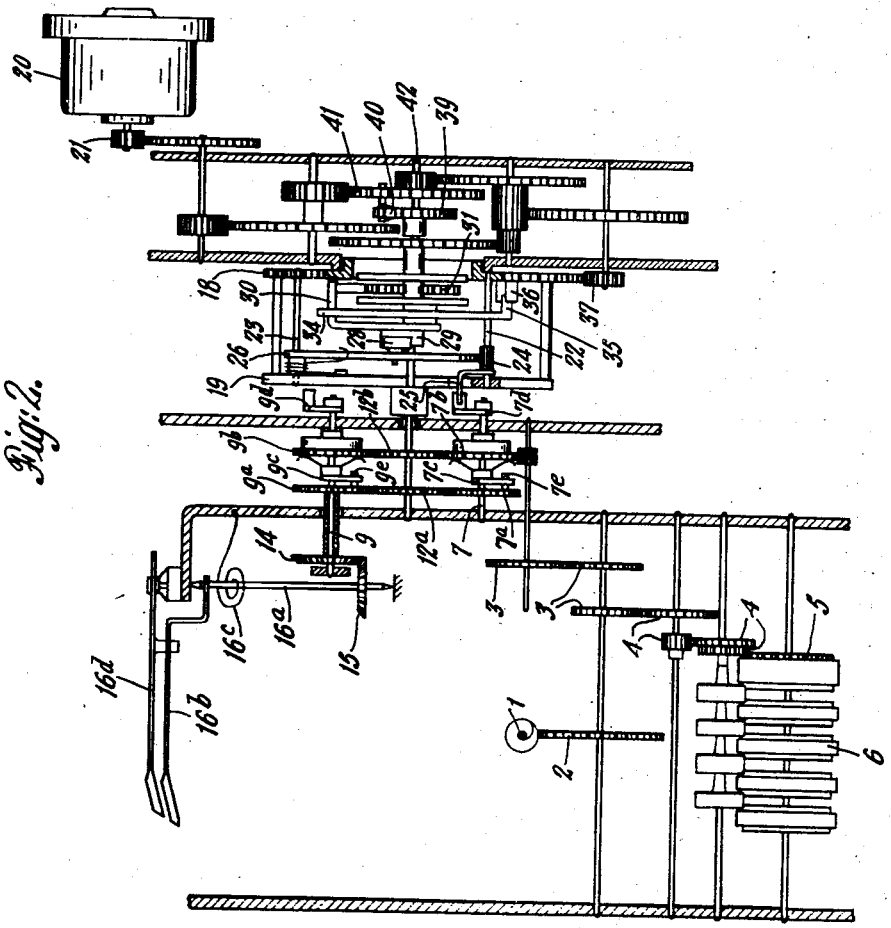

Fig. 2 which is an end view in fragmentary cross-section illustrating the essential parts of the maximum demand metering device and their reciprocal arrangement according to the invention.

Figs. 3, 3a, 3b, and 3c show two charts of the means load value indicator according to the invention.

The worm of the meter armature 1 drives through the worm wheel 2, sets of gears 3, 4 and the pinion 5 the cyclometer 6 indicating the total consumption, together with a system of five shafts 7, 8, 9, 10, 11, each of them carrying two gear wheels 7a—11a, 7b—11b and two levers 7c—11c, 7d—11d which are coupled among themselves by two wheels 12a, 12b on the center axis, thus forming side by side two suitably spaced assemblies of wheels, each arrangement in one plane. All the wheels 7b—11b of the one assembly of wheels associated with the levers or steering members 7d—11d are loose on the shafts 7—11, but are coupled thereto by friction clutches 13, one only of which is shown, for example, on wheel 9b of Fig. 1—on the shafts 7—11 and cause them to turn forward through the same angle, whereas the wheels 7a—11a pertaining to the levers or pushers 7c—11c are loosely supported. The levers 7c—11c are fixed rigidly to the shafts 7—11, whereby the levers 7c—11c act each on a pusher pin 7e—11e on the wheels 7a—11a of the one assembly. As the wheels 7b—11b are interconnected (coupled among themselves) by the center wheel 12b, all the wheels 7b—11b are turned forward through the same angle.

The wheels 7a—11a act in common through one of the pusher wheels, say 9a (Figs. 1 and 2) by way of wheel 12a and via bevel gear 14, 15 on the pusher arm 16b designed as pointer and rigidly mounted on the shaft 16a, whereby said arm is turned forward through the same angle in proportion to the gear of the wheels 14 and 15. The pusher arm 16b is under action of a spiral spring 16c which tends to turn the arm and therewith the shaft 16a, the gear 14, 15 and through the wheel 9a the corresponding set of wheels 7a—11a inversely to the rotary direction caused by the pushers 7c—11c, i. e., backwards.

The pusher arm 16b thus acting as mean load value indicator is connected in the known manner to a sweep hand 16d serving as a maximum pointer.

According to the present example let it be presumed that the recording period is 15 minutes; in this case the resetting of each of the provided five pushers 7c—11c or levers 7d—11d into the initial position occurs periodically every 3 minutes due to the action on the levers 7d—11d so that the respective axes and hence the pushers 7c—11c are consecutively set back to zero position.

Essentially the reset device includes the following parts which are arranged on a rotary carrier cage or casing 17 which consists of a toothed wheel 18 and a plate 19 connected therewith by one or more ties. The cage is driven through the toothed wheel 18 from a synchronous motor 20 serving as timing element via through actuation of gearing, hereinafter described by the pinion 21 and makes one revolution for each recording period. In the cage 17 two shafts 22 and 23 are provided, and the shaft 22 is rigidly connected to the pinion 24 and a lever 25 which serves as resetter. The pinion 24 is actuated by a cog sector 26 fulcrumed on a shaft 23 and bearing with a roller 28 under pressure of a spring against an eccentric 29 rigidly mounted on the shaft 42 and freely supported in the cage 17. As the cage makes one revolution for each recording period (say 15 minutes) the shafts 22 of the cage arrives in turn in equal time intervals (3 min.) opposite successive ones of the shafts 7—11, whereby each time the corresponding shaft 7—11 with the steering member 7d—11d or pusher 7c—11c is returned to zero position through the medium of lever 25. This performance is—as hereinafter described—brought about by a special contrivance. For this purpose the eccentric 29 is provided with a lateral extension 30 through which it is coupled by way of a spring 31 with another eccentric 32 or rather its shaft 38. The other end of the spring is secured to the shaft 38. The shaft 38 with the eccentric 32 freely supported by the shaft 42, is driven from a clockwork 20 via wheel 41 and intervening gearing and makes in relation to the cage one revolution during each displacement period between two consecutive recording periods, i. e., every 3 minutes with the present example. On the eccentric 32 a slide 33 is provided having one fork-shaped end 34 through which the spring-connected lateral extension 30 of the eccentric 29 passes. At the other end the slide 33 bears a lateral projection 35 which, under action of spring 31, bears against a pin 36 on wheel 18. Consequently the eccentric 29 is coupled via slide 33 and its stop (striking piece) on pin 36—on the one hand with the cage 17 and moves with it; on the other hand the eccentric 29 is likewise coupled to the spring 31.

Upon rotation of the eccentric 32 the slide 33 with projection 35 carries out for each revolution one linear to-and-fro movement, whereby the slide with the projection 35 can drop from pin 36 and makes, under action of the spring, one quick revolution inversely to its normal rotation. In doing so it takes the eccentric 29 with it which now controls the resetter via roller 28, sector 26 and pinion 24. Upon rotation of the eccentric 29 the cog sector performs one to-and-fro oscillating motion and accordingly also the shaft 22 with pinion 24 and resetting lever 25—the stroke of the eccentric 29 and the gear ratio of sector 26 with respect to the pinion 24 being thereby so chosen that the rotary angle of lever 25 corresponds to the maximum forward rotation of the steering members or levers 7d—11d. After the single rotation the eccentric is again set quiescent as the slide 33 engages the pin 36a. If during further rotation of the eccentric 32 the slide 33 is again shifted inwardly, it strikes on pin 36, thus becoming again ready for the next reset function. Therefore, during the aforementioned revolution of the eccentric 29 the resetting of one of the corresponding steering members 7d—11d or pusher levers 7c—11c takes place and the resetter 25 made anew ready for the next operation, whereby the wheels 7a—11a with their pusher-pins 7e—11e are set back by the spring until one of the pins 7e—11e engages the next pusher 7c—11c.

While the cage 17 or its resetter shaft 22 moves from one maximum shaft to the other, i. e., from the shaft 11 to the next shaft 7, the eccentric 32 turns once about itself through the wheel 37—the spring 31 being thereby wound up by one turn and the slide, as described, led through between the pins 36 and 36a. The rotation of the cage 17 together with the wheel 37 with the shaft 38 and the eccentric 32 takes place through the medium of gearing between the gear 41 and a pinion 21 on the shaft of the synchronous motor 20, which serves at the same time as timing element for determining the recording periods and as a source of energy for winding up the spring 31. The gearing between the gear 41 and pinion 21 includes a pair of change-wheels, whose gear reduction determines the duration of the registering period. The motor 20 actuates through the shaft 42 a ratchet wheel 39 rigidly mounted thereon and engaged by a pawl 40 arranged on wheel 41. This prevents the eccentric and with it the resetting means, upon release, from being retracted too rapidly by the action of the spring 31, but with the specified speed of wheel 41, because with the reset turn of the eccentric 29 the pawl 40 engages the teeth of wheel 39, whereas with the normal rotation of the eccentric 29 with the cage in the other direction the pawl 40 slides on the wheel 39. Consequently if, e. g., the rotation of eccentric 29 lasts four seconds for the steering operation, two seconds each fall to the to-and-fro motion of the resetting lever 25; hence the time of resetting the maximum shafts 7—11 is likewise two seconds.

The action of the contrivance according to the invention is best seen connectively on Figs. 1 to 3, it being thereby assumed that the recording period is 15 minutes, so that the shafts 7—11 are each reset every 3 minutes.

The reset device, according to Fig. 1, is indicated as being shortly prior to the release, i. e., of resetting the shaft 7 to zero position. The synchronous motor 20 has on the one hand via wheel 21 and the cage 17 carried the shaft 22 with pinion 24 and resetting lever 25 from the shaft 8 to the shaft 7 with the steering member 7d. On the other hand the motor has turned the eccentric 32 once through the wheel 37 and the shaft 38 during the time, when the shaft 22 of the cage 17 was conveyed from the shaft 11 to shaft 7 of the wheel assembly, thus winding up the spring 31. The eccentric 32 has shifted the slide 33 so far outwardly between the pins 36 and 36a that it leans only on a small surface against the pin 36 (see Fig. 1). If the cage now continues to rotate in the direction indicated by the arrow P the shaft 22 with the resetter 25 moves closer and closer to the shaft 7. As soon as the shafts 22 and 7 lie on a same level, the slide, due to further rotation of the eccentric 32 has also moved so far outwardly that under action of spring 31 it falls over the pin 36 and makes—in the contrary direction of the arrow P— a quick turn with the eccentric 29, whereupon the slide 33 strikes against the pin 36a and the spring 31 is detensioned. With this revolution the eccentric 29 imparts a single to-and-fro motion to the toothed sector 27 which is transferred to the resetter 25, the latter being then conveyed towards the steering member 7d and swings this, thus moving the shaft 7 with the pusher 7c back to zero position. By the to-and-fro motion of the resetter it is again also brought back to normal position. The cage 17 continues to turn till the shaft 22 with its pinion 24 and the resetter 25 arrive in line with the next shaft. At the start of the new time interval of three minutes the slide 33, due to rotation of eccentric 32, again moves back and falls from pin 36a onto pin 36; it is now again in its position between the two pins 36 and 36a and is again shifted outwards by the eccentric 32. Simultaneously the spring 31 is again wound up and the resetting of the shaft 11 with its steering member 11d and the pusher 11c is repeated.

The energy consumption taken up by the counter 1 is conveyed not only to the cyclometer 6 but also through the shafts 9—11 to the wheel 9a and consequently to the mean value indicator 16b. If, in the selected example with five pushers and average periods of 15 minutes, every three minutes one of the five pushers 7c—11c is restored to zero position, the load mean value indicator or pusher 16b for the maximum pointer 16d is not brought back likewise to zero position, but only far enough for the wheels 7a—11a to be stopped by striking one of their pins 7e—11e at the next of the pushers 7c—11c.

Fig. 3 shows two charts of the mean load value indicator according to the invention, i. e., Fig. 3a for constant load and Fig. 3b for step loads.

In the top picture of Fig. 3a the load is indicated as ordinate in kwh., while the abscissa axis represents the time. In the bottom picture of Fig. 3a the pointer deflection of the mean value indicator is recorded in the ordinate according to the constant load shown in the top picture.

At the start the pointer 16b rises to the height given by the constant load, as all the five pushers 7c—11c press on the corresponding pins 7e—11e. After the first three minutes the first pusher is restored to zero position, and after another three minutes the second and so on till after the lapse of the five times three minutes, i. e., the averaging period, the last pusher is reset to zero position. At this juncture the first pusher has already risen again to 1/5 of the load mean value so that the pointer can only be brought back by the spring 16c to this amount.

Hence the load mean value indicater 16b is constantly moving between an amount of 4/5 and 5/5, i. e., 80 to 100 per cent of the load mean-value. At the end of each 1/5 recording period it is reset to 80% and rises during the next 1/5 to 100%, dropping again to 80% at the end of this one-fifth.

The line a shows the position of the maximum pointer 16d and the line b the movements of the load mean-value indicator 16b. The heavy lines c illustrate the path of the pointer 16b in case only one pusher would be provided instead of five. In such an instance the pointer 16b would be restored to zero position according to the hitherto usual maximum pointer after each recording period.

At the end of every reading period the maximum pointer is reset either automatically or by hand, but only far enough to touch the mean-value indicator 16b. Automatic resetting can be performed by a timing element, say by a control through the medium of a calendar clock by which the steering is neutralized as soon as the maximum pointer touches the mean value indicator, i. e., makes contact with it. If the load is zero the mean value indicator is automatically reset to zero.

From the foregoing specification the advantage of the invention will be apparent by the difference between the guiding of the load mean-value indicator 16b, i. e., by employing a maximum demand metering device with several times overlapped recording period and the guiding of the pointer with non-overlapped period, that is to say only with one pusher. By the device according to the invention an indicating maximum demand metering device has been created which continuously indicates the load mean-value and is therefore to a certain extent similar to the watt-meter without, however, possessing its sensitive measuring work.

The top sketch of Fig. 3b shows a stepped load; the bottom picture the corresponding course of the load mean-value indicator according to the invention.

Complementary to the device specified hereinbefore, a printing device of a known design can preferably be provided for the load mean-value indicator which then records the diagrams b as shown in Figs. 3a and 3b.

I wish to be understood that I do not desire to be limited to the exact details of construction shown and described, for obvious modifications will occur to a person skilled in the art.

What I claim is:

1. A demand meter including a driving mechanism embodying a set of driving shafts, a set of driving gears, one on each shaft and having clutch connection therewith, a set of transmission gears, one loose on each shaft, motion transmitting members on the shafts for transmitting motion therethrough from the driving gears at the same angular rate of speed, means adapting the shafts to be operated to reset the motion transmitting members for motion transmitting actions on the transmission gears to provide overlapping demand intervals during a demand period, a meter geared to the driving gears to continuously rotate the same, a timer operated means for successively resetting the motion transmitting means for driving the respective transmission gears, a demand indicator, and means operated by one of the transmission gears for operating the demand indicator.

2. A demand meter including a driving mechanism embodying a set of driving shafts, a set of driving gears, one on each shaft and each having a clutch connection with its shaft adapting the shaft to rotate with the gear and to be rotated independently thereof, a set of transmission gears, one loose on each shaft, means connecting the gears of each set to rotate at the same angular rate of speed, a pusher on each shaft engageable with the transmission gear thereon to rotate said gear, levers on the shafts for rotating said shafts independently of the driving gears to reset the pushers for driving actions on the transmission gears to provide overlapping demand intervals during a demand period, a meter in driving connection with one of the driving gears for continuously rotating said gears in a driving direction, a demand indicator, means actuated by one of the transmission gears for transmitting the motions of the transmission gears as received from the driving gears to the demand indicator for operating said indicator, and timer driven means for action on the resetting levers to successively reset the pushers.

3. A demand meter including a driving mechanism embodying a set of driving shafts, a set of driving gears, one on each shaft and each having a clutch connection with its shaft adapting the shaft to rotate with the gear and to be rotated independently thereof, a set of transmission gears, one loose on each shaft, means connecting the gears of each set to rotate at the same angular rate of speed, a pusher on each shaft engageable with the transmission gear thereon to rotate said gear, levers on the shafts for rotating said shafts independently of the driving gears to reset the pushers for driving actions on the transmission gears to provide overlapping demand intervals during a demand period, a meter in driving connection with one of the driving gears for continuously rotating said gears in a driving direction, a demand indicator, means actuated by one of the transmission gears for transmitting the motions of the transmitting gears as received from the driving gears to the demand indicator for operating said indicator, and timer driven means for resetting the pushers, said timer driven means comprising a rotary element operated by the timer, a resetting member mounted on the rotary element and rotatable therewith, and means operated periodically in the rotation of the rotary element for causing said resetting member to successively engage the resetting levers to reset the pushers.

4. A demand meter including a plurality of driving elements, a plurality of driven elements coupled to rotate at the same angular rate of speed, driving connections between the driving and driven elements adapted to be successively reset to operate the driven elements for motion transmitting actions in timed order to provide overlapping demand intervals during a demand period, a meter for driving said driving elements, timer operated means for successively resetting the driving connections at intervals during the demand period, and a demand indicator operated by one of the driven elements.

5. A maximum demand meter including a set of driving gears, a set of transmitting gears, a gear connecting the gears of each set to cause them to rotate at the same angular rate of speed, driving connections between the driving and driven gears adapted to be successively reset to operate the driven gears for motion transmitting actions in timed order to provide overlapping demand intervals during a demand period, a meter for driving the driving gears, timer operated means for successively resetting the driving connections at intervals during the demand period, and a demand indicator operated by one of the driven gears.

6. A demand meter including a plurality of driving elements, a plurality of driven elements coupled to rotate at the same angular rate of speed, driving connections between the driving and driven elements adapted to be successively reset to operate the driven elements for motion transmitting actions in timed order to provide overlapping demand intervals during a demand period, a meter for driving said driving elements, timer operated means for successively resetting the driving connections at intervals during the demand period, an indicator shaft in gear with one of said driven elements, a demand indicator carried by said shaft, a maximum demand indicator also carried by said shaft, and a spring tensioned by movement of said shaft in an indicator advancing direction to move the shaft in the reverse direction.

7. A demand meter including a driving mechanism embodying a set of driving shafts, a set of driving gears, one on each shaft and having a clutch connection with its shaft adapting the shaft to rotate with the gear and to be rotated independently thereof, a set of transmission gears, one loose on each shaft, a pusher on each shaft engageable with the transmission gear thereon to rotate said gear, means connecting the gears of each set to rotate at the same angular rate of speed, levers on the shafts for rotating said shafts independent of the driving gears to reset the pushers for driving actions on the transmission gears to provide overlapping demand intervals during a demand period, a meter in driving connection with one of the driving gears for continuously rotating said gears in a driving direction, a demand indicator, means actuated by one of the transmission gears for transmitting the motions of the transmission gears to the demand indicator, and means for operating the resetting levers to rotate the shafts to reset the pushers, said means comprising a timer, a rotary element operated by the timer, a resetting member movably mounted on and rotatable with the rotary element so as to be brought into position to successively engage the resetting levers, and means operated periodically in the rotation of the rotary element to cause said member to successively engage and operate the resetting levers to reset the pushers.

8. A demand meter including a driving mechanism embodying a set of driving shafts, a set of driving gears, one on each shaft and having a clutch connection with its shaft adapting the shaft to rotate with the gear and to be rotated independently thereof, a set of transmission gears, one loose on each shaft, a pusher on each shaft engageable with the transmission gear thereon to rotate said gear, means connecting the gears of each set to rotate at the same angular rate of speed, levers on the shafts for turning said shafts independent of the driving gears to reset the pushers for driving actions on the transmission gears to provide overlapping demand intervals during a demand period, a meter in driving connection with one of the driving gears for continuously rotating said gears in a driving direction, a demand indicator, means actuated by one of the transmission gears for transmitting the motions of the transmission gears to the demand indicator, and means for operating the resetting levers to rotate the shafts to reset the pushers, said means comprising a timer, a rotary element continuously operated by the timer, a resetting member pivotally mounted on the rotary element and rotatable therewith so as to be brought into position to successively engage the resetting levers, and means operated periodically in the rotation of the rotary element to move the resetting member to cause said member to engage and successively operate the resetting levers to reset the pushers.

9. A demand meter including a driving mechanism embodying a set of driving shafts, a set of driving gears, one on each shaft and having a clutch connection with its shaft adapting the shaft to rotate with the gear and to be rotated independently thereof, a set of transmission gears, one loose on each shaft, a pusher on each shaft engageable with the transmission gear thereon to rotate said gear, means connecting the gears of each set to rotate at the same angular rate of speed, levers on the shafts for rotating said shafts independent of the driving gears to reset the pushers for driving actions on the transmission gears to provide overlapping demand intervals during a demand period, a meter in driving connection with one of the driving gears for continuously rotating said gears in a driving direction, a demand indicator, means actuated by one of the transmission gears for transmitting the motions of the transmission gears to the demand indicator, and means for operating the resetting levers to turn the shafts to reset the pushers, said means comprising a timer, a rotary element continuously operated by the timer, a pivotally mounted resetting member carried by and rotatable with the rotary element so as to be brought into position to successively engage the resetting levers, and means including an actuating gear on the rotary element operated periodically in the rotation of said rotary element to move the resetting member into engagement with and to cause said member to successively operate the resetting levers to reset the pushers.

10. A maximum demand meter comprising a plurality of rotary shafts, a group of transmission gears, one loosely mounted on each shaft, said gears being connected to rotate at the same angular rate of speed, a plurality of driving gears, one on each shaft, said gears being connected to rotate at the same angular rate of speed and each gear having a clutch connection with the shaft to normally couple the shaft thereto for motion therewith in a driving direction while permitting the shaft to be independently moved in the opposite direction, a meter operatively coupled to the driving gears for continously rotating the same, pushers on the shafts for transmitting motion therefrom to the transmission gears, a demand indicator driven by one of the transmission gears, resetting elements on the shafts for turning the shafts successively of the driving gears to successively reset the pushers of the transmission gears to provide overlapping intervals during a demand period, a timer, and means operated by the timer to successively operate the resetting elements.

PAUL HEYNISCH.